Aug. 12, 1958   C. W. SHERWIN   2,847,667
SYNCHRONIZATION SYSTEM
Filed April 12, 1946

INVENTOR
CHALMERS W. SHERWIN
BY
ATTORNEY

United States Patent Office 2,847,667
Patented Aug. 12, 1958

2,847,667
SYNCHRONIZATION SYSTEM

Chalmers W. Sherwin, Leonia, N. J., assignor, by mesne assignments, to the United States of America as represented by the Secretary of the Navy Application April 12, 1946, Serial No. 661,595

4 Claims. (Cl. 343—16)

This invention relates to azimuth synchronization for relay radar and more specifically to such azimuth synchronization employing radar trigger pulses to give azimuth angle position.

Relay radar systems are in use where the radar data obtained by a radar set at one location is transmitted by radio to some remote location and presented on indicators there. It is necessary to synchronize the rotation of the sweep of these remote indicators with the rotation of the scanning antenna of the radar set. There are several means for accomplishing such synchronization. One method is disclosed in Patent Application, Serial No. 592,794, filed May 9, 1945, now Patent No. 2,698,931, granted Jan. 4, 1955 by Stanley A. Van Voorhis. In this application, equally spaced azimuth trigger pulses are developed by the scanning antenna and used to trigger the radar transmitter. The radar trigger pulses received then are related to the antenna position and are thus used to synchronize the remote indicators by moving the sweeps a definite amount for each pulse received. Thus the operation of the radar is dependent on the scanning of the antenna and each radar trigger in turn will occur at a rate determined by the scanning antenna. If there is any "jitter" in the triggering of the transmitter so that it does not trigger exactly in step with the antenna or if some trigger pulses are missed, then the remote indicators will fall out of step with the scanning antenna.

It is therefore an object of this invention to provide a means for synchronizing remote indicators by means of received radar trigger pulses independently of the radar repetition rate and any jitter therein.

Another object of this invention is to provide means for employing radar trigger pulses and equally spaced azimuth pulses at a lower repetition rate than the radar trigger pulses to produce and transmit the same number of radar triggers as azimuth pulses which can be used for synchronizing remote indicators.

A still further object of this invention is to provide means for developing a square waveform with the average period of the complete waveform exactly related to the equal azimuth angle pulses from the scanning antenna and which will continuously drive the remote azimuth synchronous motors in step with the scanning antenna.

These and other objects will be apparent from the following specification when taken with the accompanying drawing in which.

Figure 1:
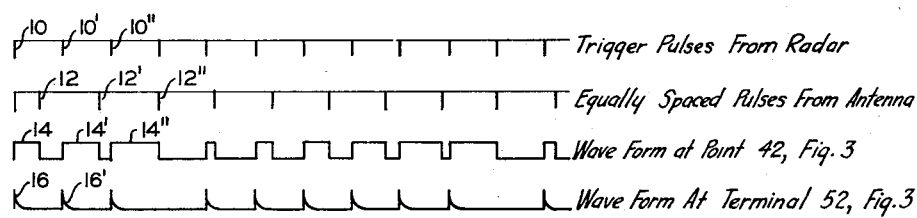
Fig. 1 shows the waveforms and pulses developed at the relay transmitter.

The operation of the system will now be described briefly before proceeding with the detailed features of the invention. Radar trigger pulses are taken from the radar and applied to a "flip-flop" circuit along with equal-angle trigger pulses from the scanning antenna, the latter having a lower repetition rate.

The "flip-flop" circuit referred to here is one which puts out a square pulse from a series of trigger pulses. The first trigger pulse starts the square wave and the next pulse terminates the square wave. This is similar to the action of a conventional Eccles-Jordan trigger circuit.

The equal trigger pulses are developed by the antenna as it scans. At constant intervals of rotation a pulse is produced by the scanning antenna and since the antenna rotates at constant speed the pulses will be developed at equal angle intervals.

The flip-flop circuit puts out a series of pulses equal in number of the number of equal-angle pulses applied. The trigger pulses thus developed are transmitted to the remote indicators where they are "counted down" to get a lower repetition rate. These triggers from the relay link are matched one-to-one with the equal angle triggers and the wave form developed will go through exactly one complete cycle for a certain number of trigger pulses. This waveform is used to drive a synchronous motor in step with the scanning antenna which motor drives the azimuth sweeps of the remote indicators.

The operation will now be described in detail referring first to Fig. 1. Negative pips 10, 10' etc. are taken from the radar transmitter, not shown, at the time of each transmitted pulse. Negative pulses 12, 12' etc. are received from a scanning antenna at definite equally spaced azimuth angle positions. The speed of antenna rotation and the radar pulse repetition rate is such that the repetition rate of the azimuth pulses 12, 12' etc. is less than the repetition rate of the radar trigger pulses. Negative azimuth pulses are applied at terminal 30 to the flip flop circuit shown in Fig. 3. Negative radar pulses are applied at terminal 36 of Fig. 3 of the same flip flop circuit. The azimuth pulses 12 Fig. 1 are coupled through capacitor 32 to the grid of tube 34 and the radar pulses 10 Fig. 1 are coupled through capacitor 38 to the grid of tube 40.

Figure 3:
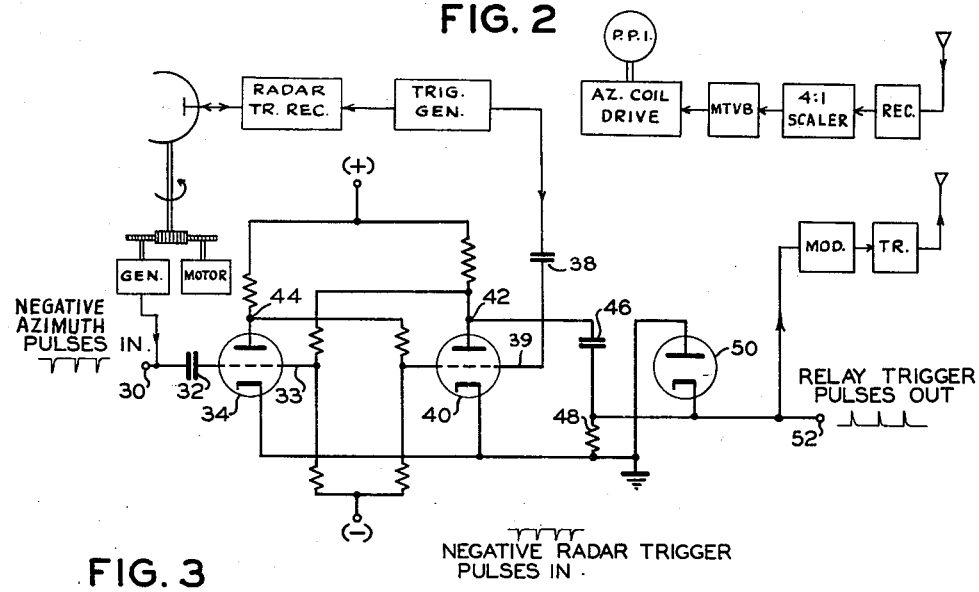
Fig. 3 shows the circuit used to develop the radar triggers that are transmitted.

Referring now to Figs. 1 and 3 the operation of part of the relay transmission system will be described. The radar trigger pulse 10 drives the grid of tube 40 negatively causing the voltage on the plate 42 to rise, which in turn causes the voltage on grid 33 to rise. The voltage of plate 44 thus drops and grid 39 is held negative for a time. This causes the waveform 14 which is developed at point 42, to rise, and then remain constant. When pulse 12 is received at terminal 30 following pulse 10 it is coupled through capacitor 32 to drive grid 33 negatively and thus cause the voltage at plate 44 to rise. This in turn causes the voltage on grid 39 of tube 40 to rise and reduce the voltage (waveform 14) at plate 42 at the time of azimuth pulse 12. The next pulse 10' in turn causes the same action starting a square pulse 14' which lasts until azimuth pulse 12' occurs. These square pulses 14, 14' etc. are applied to a differentiating circuit composed of capacitor 46, resistor 48 and clamping diode 50. The leading edge of each pulse 14, 14' etc. is passed by capacitor 46 and then as the capacitor 46 charges it decays exponentially as shown by pulse 16, 16' etc. Upon the trailing edge of each pulse 14, 14' etc., diode tube 50 conducts and prevents any negative pulse in the output at terminal 52.

As stated above azimuth pulses 12, 12' etc. occur at a lower repetition rate than radar pulses 10, 10' etc. and occasionally an azimuth pulse 12'', for example, will occur at the same time as a radar pulse 10'', for example, and pulse 12'' will terminate the pulse 14''. The pulse 10'' will not start another square pulse similar to pulse 14, 14' etc. It may even happen that two radar pulses occur during the interval between two azimuth pulses, in such a case, the first of the two radar pulses will start a square wave but the second radar pulse will not affect the square pulse and the next azimuth pulse will terminate the square pulse. In any case the result will be that some of the radar trigger pulses 10, 10' etc. will be eliminated. In fact, enough radar triggers will be eliminated in this manner that the number of transmitter trigger pulses 16, 16' etc. generated from square pulses 14, 14' etc. will be exactly the same as the number of azimuth pulses 12, 12' etc. during any given period. The trigger pulses 16, 16' etc., thus developed, are transmitted to the remote indicators to trigger off the sweeps there as well as provide azimuth synchronization.

Figure 2:
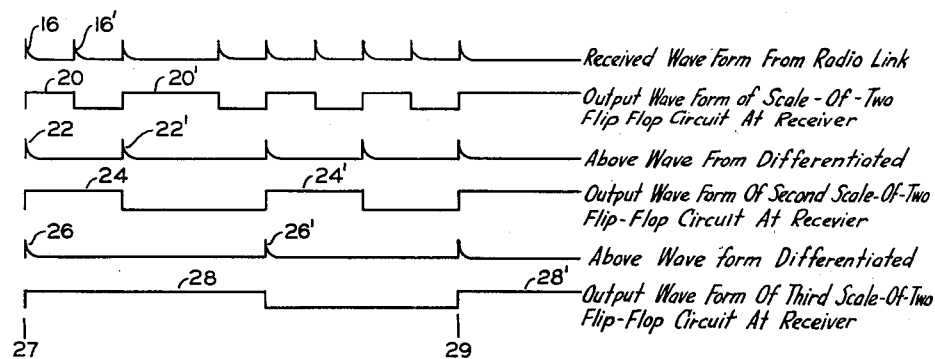
Fig. 2 shows the waveforms at the remote indicators.

The transmitted trigger pulses 16, 16' etc. occur with any time interval between pulses and independent of the radar recurrence rate, but a definite number in any time interval depending on the rotation speed of the antenna scanner. The trigger pulses received are counted down by flip flop and differentiating circuits each similar to the one shown in Fig. 3. Triggers 16, 16' etc. are applied to such a flip flop circuit to develop the square waves 20, 20' etc. Fig. 2, which are differentiated to produce the pulses 22, 22' etc. at a repetition rate one half that of the applied pulse 16, 16' etc. Similarly pulses 22, 22' etc. are counted down to obtain pulses 26, 26' etc. which occur at one quarter the repetition rate of the received trigger pulses 16, 16' etc. The square waves 28, 28' etc. are developed from the pulses 26, 26' etc. by means of another flip flop circuit. The average period of the complete wave 28 from point 27 to point 29 is determined by the received trigger pulses 16, 16' etc. which have been counted down. The triggers 16, 16' etc. are matched one-to-one with the equal angle triggers 12, 12' etc. Fig. 1. Eight triggers 16, 16' etc. occur in the period between 27 and 29 and thus the average period of a complete wave 28 is related to the equal-angle triggers from the antenna. The azimuth drive motor for the remote indicators is driven from an amplifier by the wave 28 and since wave 28 is related to the triggers received the azimuth drive motor will operate in step with the scanning antenna. As may be seen in Fig. 2 the positive portion of one wave 28 shown here is larger than the corresponding portion of waveform 28'. This is caused by the occasional missing of radar triggers but the synchronous azimuth motor is not sensitive to small changes in the shape of waveform 28 thus the azimuth motor will keep in step with the scanning antenna.

This invention then allows transmission of azimuth synchronizing data by means of radar trigger pulses which within limits is independent of the radar pulse repetition frequency and any jitter in the radar pulsing. It should be noted that although the system has been described using the radar trigger pulse to relay azimuth synchronization it could also be done by using a separate pulse separated from the radar trigger pulse by a definite time interval.

It is believed that the construction and operation as well as the advantages of my improved relay radar azimuth synchronization will be apparent from the foregoing detailed description thereof. It will also be apparent that while I have shown and described my invention in a preferred form changes may be made in the circuit disclosed without departing from the spirit of the invention as sought to be defined in the following claims.

What is claimed is:

1. In a radar relay system, relay transmitter apparatus for producing synchronizing pulses for causing a radial sweep on a remote indicator to rotate in synchronism with the azimuthal scanning motion, of a rotating directional antenna of a radar system comprising, a source of trigger pulses having a first repetition rate for pulsing said radar system, means for generating azimuth pulses at equally spaced azimuth angle positions of said antenna and at a repetition rate lower than said first repetition rate, a triggered multivibrator, means applying said trigger pulses to said multivibrator to initiate a rectangular output voltage wave and applying said azimuth pulses to terminate said output voltage wave, means for differentiating said output voltage wave so as to develop positive and negative peaked pulses corresponding to the leading and trailing edges respectively of said output voltage wave and means for transmitting only said positive peaked pulses.

2. In a radar relay system for transmitting radar trigger pulses, radar data and azimuth synchronization pulses to a remote indicator, means for generating a series of equally spaced azimuth pulses at equally spaced azimuth angle positions of the scanning antenna of said radar system and at a lower repetition frequency than said radar trigger pulses, means responsive to said radar trigger pulses and said azimuth pulses to produce a series of synchronizing pulses equal in number to said azimuth pulses for a given period of time and occurring in time coincidence with said radar trigger pulses, means for transmitting said synchronizing pulses and receiver means for developing a control voltage from said synchronizing pulses for driving a remote indicator in synchronism with said scanning antenna.

3. In a radar relay system for transmitting radar trigger pulses, radar data and azimuth synchronizing pulses to a remote indicator, means for generating azimuth pulses at equally spaced azimuth angle positions of the scanning antenna of said radar system at a lower repetition frequency than said radar trigger pulses, means responsive to said radar trigger pulses and said azimuth pulses to produce a series of synchronizing pulses equal in number to said azimuth pulses and occurring in time coincidence with said radar trigger pulses, thereby eliminating predetermined radar trigger pulses, means for transmitting said synchronizing pulses to a remote location, means for receiving said synchronizing pulses at said remote location, means for dividing in frequency the synchronizing pulses received, and means for developing a square wave with an average period related to the repetition rate of said azimuth pulses to drive said remote indicator in synchronism with said scanning antenna.

4. In a radar relay system wherein synchronizing pulses are transmitted from a first radar set to a remote radar set and employed thereat both to indicate the time at which said first radar set is triggered to radiate a search pulse and to maintain the radial sweep of the plan position indicator in said remote radar set in synchronism with the movement of the rotating scanning antenna of the first radar set, the combination of a source of trigger pulses having a first repetition rate for periodically pulsing said first radar set, means for generating azimuth pulses at equally spaced azimuth angle positions of the directional antenna of said first radar set, said azimuth pulses having a repetition rate which is lower than said first rate, a multivibrator, means for coupling said trigger pulses to one input of said multivibrator to initiate a rectangular output voltage wave and for coupling said azimuth pulses to a second input of said multivibrator for terminating said output voltage wave, means for differentiating said output voltage wave thus generated whereby positive and negative peaked pulses are produced corresponding to the time of occurrence of the leading and trailing edges respectively of said output voltage wave, and means for transmitting only said positive peaked pulse as synchronizing pulses to said remote radar set.

References Cited in the file of this patent

UNITED STATES PATENTS

| | | |
|---|---|---|
| 1,979,484 | Mathes | Nov. 6, 1934 |
| 2,208,376 | Luck | July 16, 1940 |
| 2,252,083 | Luck | Aug. 12, 1941 |
| 2,416,088 | Deerhake | Feb. 18, 1947 |
| 2,517,540 | Busignies | Aug. 8, 1950 |
| 2,519,935 | Smith | Aug. 22, 1950 |
| 2,529,823 | Starr | Nov. 14, 1950 |
| 2,543,002 | Deloraine | Feb. 27, 1951 |
| 2,547,945 | Jenks | Apr. 10, 1951 |
| 2,552,172 | Hawes | May 8, 1951 |